United States Patent
Lobo

(10) Patent No.: US 7,054,658 B1
(45) Date of Patent: May 30, 2006

(54) PULSE SHAPING ACCORDING TO MODULATION SCHEME

(75) Inventor: Natividadel Lobo, Windsor (GB)

(73) Assignee: Nokia Mobile Phones Limited, Espoo (FI)

( * ) Notice: Subject to any disclaimer, the term of this patent is extended or adjusted under 35 U.S.C. 154(b) by 910 days.

(21) Appl. No.: 09/625,202

(22) Filed: Jul. 21, 2000

Related U.S. Application Data

(63) Continuation of application No. PCT/GB99/00203, filed on Jan. 21, 1999.

(30) Foreign Application Priority Data

| Jan. 21, 1998 | (GB) | 9801302 |
| Jan. 21, 1998 | (GB) | 9801305 |
| Jan. 21, 1998 | (GB) | 9801306 |
| Jan. 21, 1998 | (GB) | 9801308 |
| Mar. 5, 1998 | (GB) | 9804600 |
| Mar. 11, 1998 | (GB) | 9805126 |
| Mar. 12, 1998 | (GB) | 9805234 |
| Mar. 13, 1998 | (GB) | 9805504 |

(51) Int. Cl.
*H04L 27/36* (2006.01)
*H04L 27/26* (2006.01)

(52) U.S. Cl. ............ 455/553.1; 455/102; 455/108; 370/204; 370/205

(58) Field of Classification Search ............ 455/553.1, 455/127.4, 102, 104, 108; 370/204, 205, 370/208, 210; 375/316, 353

See application file for complete search history.

(56) References Cited

U.S. PATENT DOCUMENTS

| 4,737,969 A | 4/1988 | Steel et al. |
| 4,750,192 A | 6/1988 | Dzung |
| 5,481,533 A | 1/1996 | Honig et al. |
| 5,790,516 A * | 8/1998 | Gudmundson et al. ..... 370/210 |
| 5,805,581 A * | 9/1998 | Uchida et al. ............. 370/335 |
| 5,953,377 A * | 9/1999 | Yoshida ..................... 375/295 |
| 6,005,896 A * | 12/1999 | Maruyama ................. 375/295 |
| 6,006,108 A * | 12/1999 | Black et al. ............. 455/553.1 |
| 6,137,826 A * | 10/2000 | Boesch ....................... 375/146 |
| 6,567,389 B1 * | 5/2003 | Honkasalo et al. ......... 370/342 |

FOREIGN PATENT DOCUMENTS

| EP | 0 561 258 | 9/1993 |
| GB | 2 333 674 | * 7/1999 |
| WO | WO 98/44694 | 10/1999 |

OTHER PUBLICATIONS

Laurent, P.A.: "Exact and Approximate Construction of Digital Phase Modulations by Superposition of Amplitude Modulated Pulses (AMP)", IEEE Transactions on Communications, vol. COM–34, No. 2, Feb. 1986, pp. 150–160, XP000758520.

Jung, P. et al: "On the Representation of CPM Signals by Linear Superposition of Impulses in the Bandpass Domain" IEEE Journal on Selected Areas in Communications, vol. 10, No. 8, Oct. 1, 1992, pp. 1236–1242, XP000315281.

* cited by examiner

*Primary Examiner*—William Trost
*Assistant Examiner*—Brandon J Miller
(74) *Attorney, Agent, or Firm*—Alston & Bird LLP

(57) ABSTRACT

A method is provided for defining a pulse function shape for acting on a data stream for transmission in a telecommunication system in accordance with a predetermined modulation scheme. The method comprises defining desired cost parameters (e.g., error functions for amplitude, BER, bandwidth, energy, AFC) and defining the shape of the pulse function in dependence of the desired cost parameters. A pulse generator, modulator and communications device using such a defined device are also provided. Application in dual mode TDMA/CDMA system.

34 Claims, 6 Drawing Sheets

PULSE SHAPING ACCORDING TO MODULATION SCHEME

CROSS REFERENCE TO RELATED APPLICATION

This application is a continuation of PCT application PCT/GB99/00203, filed Jan. 21, 1999.

BACKGROUND OF THE INVENTION

In digital radio telephones serial bit streams of data are transmitted over-the-air. The bit streams are used to modulate a carrier. There are several types of modulation schemes used to transmit data carried by the bit stream. For example, in GSM the modulation scheme used is Gaussian Minimum Shift Keying (GMSK) whereas in CDMA systems the modulation technique used is QPSK.

GMSK is a phase modulation that converts a serial bit stream into a phase shift of a carrier wave. The function of the modulation is to convert the incoming serial bit stream into analog signals that modulate the carrier of the transmitter. In GMSK the outgoing phase shift is filtered. The Gaussian function acts as a filter, removing the sharp edges of the digital pulses. Without this filtering the required bandwidth to transmit the signal would be far greater. Even with the gaussian filter it is acknowledged that the GSM system is spectrally inefficient. The GMSK modulation does, however, provide a constant amplitude signal that is power efficient.

In existing CDMA systems a different phase modulation technique, QPSK, is chosen to provide a higher bit rate. In QPSK orthogonal signals are transmitted which double the data rate relative to MSK modulation. In QPSK modulation the outgoing phase shift is Nyquist filtered to provide root raised cosine shaped pulses that increase the spectral efficiency and reduced bit error rate by eliminating intersymbol interference. Although QPSK with root raised cosine pulse shaping is spectrally efficient allowing a high data rate and providing a low BER, it is power inefficient.

The GSM system and existing CDMA systems were designed to meet user needs considered appropriate at their conception. As schemes for third generation systems are being planned the criteria desirable in a telecommunication system that will need to provide for user's needs well into the twenty-first century are being considered.

In third generation systems it will be important that the data rates are high enough to allow the expansion of the telecommunication industry from voice into data applications to continue without reducing the power efficiency below that acceptable for a battery powered terminal. None of the existing modulation schemes allow the data rates to be high enough to support the myriad of data applications that are required without sacrificing bit error rate and/or power efficiency to an unacceptable extent.

SUMMARY OF THE INVENTION

According to one aspect of the present invention, there is provided a method for defining the relationship between frequency and amplitude of a pulse function for acting on a data stream for transmission in a telecommunications system in accordance with a predetermined modulation scheme, the method comprising defining desired cost parameters and defining the amplitude of the pulse function over a range of frequencies in dependence on the desired cost parameters.

According to another aspect of the present invention the defined pulse function is generated by a pulse function generator.

According to a further aspect of the present invention, a modulator is provided which comprises means for shaping a data stream in accordance with the defined pulse function.

According to yet another aspect of the present invention there is provided a modulator for providing a signal for transmission in a CDMA telecommunications system in accordance with a modulation scheme, such as MSK or QPSK, wherein the data stream is shaped in accordance with a pulse generator of the present invention prior to modulation with a carrier signal.

According to a still further aspect of the present invention, there is provided a dual mode communication device operable in a first mode for a TDMA telecommunications system in which a channel is a combination of frequency and timeslot and a second mode for a CDMA telecommunications system comprising a modulator for modulating a data stream with a carrier signal in accordance with a predetermined modulation scheme common to operation in both the first and second telecommunications systems and being operable in response to respective pulse function generators for shaping the data stream in accordance with the mode of operation of the radio telephone.

According to a yet still further aspect of the present invention, there is provided a dual mode communication device operable in a first mode when a first set of cost parameters are desired and in a second mode when a second set of cost parameters are desired, the radiotelephone comprising a first pulse function generator for converting a data stream in accordance with a pulse function shaped in dependence on the first set of desired cost parameters, a second pulse function generator for converting a data stream in accordance with a pulse function shaped in dependence on the second set of desired cost parameters, and means for selecting the pulse function generator in accordance with the mode of operation of the phone, wherein at least one of the pulse functions is the defined one.

According to another aspect, a dual mode communication device is provided which is operable in a first mode when a first set of cost parameters are desired and in a second mode when a second set of cost parameters are desired, the radiotelephone comprising a modulator for modulating a data stream with a carrier signal in accordance with a predetermined modulation scheme in both the first and second modes of operation, a first pulse function generator for shaping a data stream in accordance with a pulse function shaped in dependence on the first set of desired cost parameters, a second pulse function generator for shaping a data stream in accordance with a pulse function shaped in dependence on the second set of desired cost parameters, and means for selecting the pulse function generator in accordance with the mode of operation of the phone.

According to a further aspect of the present invention, there is provided a method for selecting a modulation scheme for a communication system, the method comprising defining a pulse function for a first modulation scheme for desired cost parameters, defining a pulse function for a second modulation scheme for the same desired cost parameters, determining the resultant cost parameters for each scheme, and selecting the modulation scheme which gives good resultant cost parameters given the desired ones.

In prior art modulation schemes the pulse functions used to shape the data streams have had a predefined mathematical relationship.

For example:
root raised cosine $$H(f) = 1 \qquad |f| < \alpha$$

$$H(f) = \sqrt{\frac{1}{2}(1 - \cos(2\Pi(f - (T + \alpha)))} \qquad \alpha < |f| \le T + \alpha$$

$$= 0 \qquad |f| > T + \alpha$$

for CDMA systems in which QPSK modulation is used and PDC and NADC systems in which DQPSK modulation is used.
Gaussian $$H(f) = \frac{1}{\sqrt{2\Pi}\,\sigma} e^{\frac{-f^2}{2\sigma^2}}$$

for GSM in which an MSK modulation scheme is used.

With pulse shapes according to the conventional predefined mathematical relationships only one parameter is variable for a given energy level. For the gaussian pulse this is 'sigma' that varies the spread of the pulse allowing the bandwidth to alter at the expense of amplitude. For the root raised cosine the variable is 'alpha' that varies the frequency at which the cosine tail begins. This effects the bandwidth and consequently the power efficiency. The relationship between the cost parameters is well defined so as one improves the other declines in a determined fashion. There is no scope for improving both cost parameters.

Because of the severe restrictions placed on the trade-offs achievable by varying the single variable for the predetermined mathematical functions, the pulse shape most appropriate for each modulation scheme is quite clear. The system designer makes a decision on which modulation scheme based on its strengths and weaknesses and selects the appropriate pulse shape. The single variable of the mathematical function is set to provide an acceptable balance in the defined relationship between the cost parameters.

In the present invention, there is no predetermined mathematical relationship for the pulse shaper. The shape of the pulse is defined in order to meet desired cost parameters. There is freedom to select new pulse shapes that allow many cost parameters to be balanced against each other. The trade-off relationship between two parameters is no longer defined so restricted. This leads to a number of interesting possibilities.

With the present invention it is not necessary for the pulse shape in MSK to be gaussian. Although this particular pulse shape optimizes performance in terms of power efficiency it is not optimal in terms of spectral efficiency. By deviating from a gaussian shape in the frequency domain the balance between BER, power efficiency and bandwidth alters. The same applies to the consequences of deviations from the root raised cosine pulse shape in QPSK modulation.

Pulses in both the MSK system and the QPSK system can be shaped to provide a desired balance between cost functions (e.g. BER, bandwidth, power efficiency, AFC) rather than being at the mercy of existing trade-offs when only the parameters of a given shape pulse such as a gaussian or a root raised cosine are modified. Cost functions are functions which are positive and get smaller the better a system operates.

Simulations demonstrate that by experimenting with the pulse shape used for MSK modulation the spectral efficiency of the GSM system can be enhanced while retaining an acceptable power efficiency. This allows the existing GSM system to be enhanced to increase data rate using existing frequency bands by dividing existing channels, a channel being a combination of frequency band and timeslot.

The present invention suggests that the pulse shape in a modulation scheme can be used to alter the cost functions (parameters) of the scheme. This can be utilized in a number of ways. It allows existing modulation schemes to be looked at afresh with new pulse shapes to obtain performances that are better than those possible at present with conventional pulse shapes. By removing the strong links between particular modulations schemes and the current problems, e.g. MSK-spectral inefficiency; QPSK-power inefficiency, the modulation schemes for particular systems could be selected on a different basis.

For example, by implementing CDMA using a MSK modulation scheme with a suitable pulse shape to meet the required cost function i.e. (CDMA criteria) a dual mode GSM CDMA terminal could be constructed using a single modulator. The pulse shape would be likely to differ for each system as the cost function (desired parameters) may also differ.

The invention also allows problems with existing systems to be ameliorated. The major problem with the existing GSM system is that as data users increase they will occupy an increasing fraction of available channels. This is because if data transmission rates are to match expectations, more than one channel is needed to transmit data. If the data rate requirements are met, as the fraction of data users increases, the capacity of the system decreases. If GSM is to continue to support both voice and data users, without grinding to a halt, the number of operable channels needs to increase.

This increase in operable channels can be achieved by modifying the pulse shape in the MSK modulation scheme to reduce the relevant cost function i.e. bandwidth or bit error rate.

To support a faster data rate within existing channels, a channel can be divided either in time so that more than one frame is sent in a single time slot. Alternatively the channel could be divided in frequency to allow more than one frequency band to be sent in an existing (wider) frequency band. A data user could then send data at a faster rate by using 'subchannels' within a channel allocated by the system without reducing the capacity of the system. Without the subchannels the only way the data rate could be increased would be by using more than one channel to transmit data. For every additional channel utilized, there would be a corresponding reduction in the number of channels available, for both voice and data transmissions.

The two types of user, fast data rate and slow data rate could co-exist in the same system with only minimal changes to the GSM infrastructure (e.g. software). The proposed half rate GSM could be used, in which a half rate channel (where only one slot every other frame is dedicated per subscriber) is used for slow data rate users, This arrangement would accordingly allow GSM to evolve to become useful as a high data rate system, extending its practical life. In GSM there are 8 timeslots and 175 frequency bands. By dividing each channel into two up to twice the users could be accommodated on the existing channel. This would significantly effect the future data user capacity of the system As well as using MSK modulation in a CDMA system, pulse shaping would allow the cost functions in a QPSK modulation scheme to be optimized. This would allow the power efficiency to increase with perhaps some resulting increase in the BER and decrease in spectral efficiency. The freedom to select a pulse shape unconstrained by conventional root raised cosines and gaussian pulses allows the cost function in any of these modulation schemes to be optimized to meet desired parameters. This provides greater freedom in designing a third generation or enhanced second generation system, having desired parameters that are considered as set of weighted costs in an optimization calculation.

By experimentation, optimization could be tried for any modulation scheme and the results examined to determine the 'best' optimization for a predetermined cost function.

BRIEF DESCRIPTION OF THE DRAWINGS

Embodiments of the invention will now be described, by way of example, with reference to the accompanying drawings, of which.

DETAILED DESCRIPTION OF THE INVENTION

Figure 1:
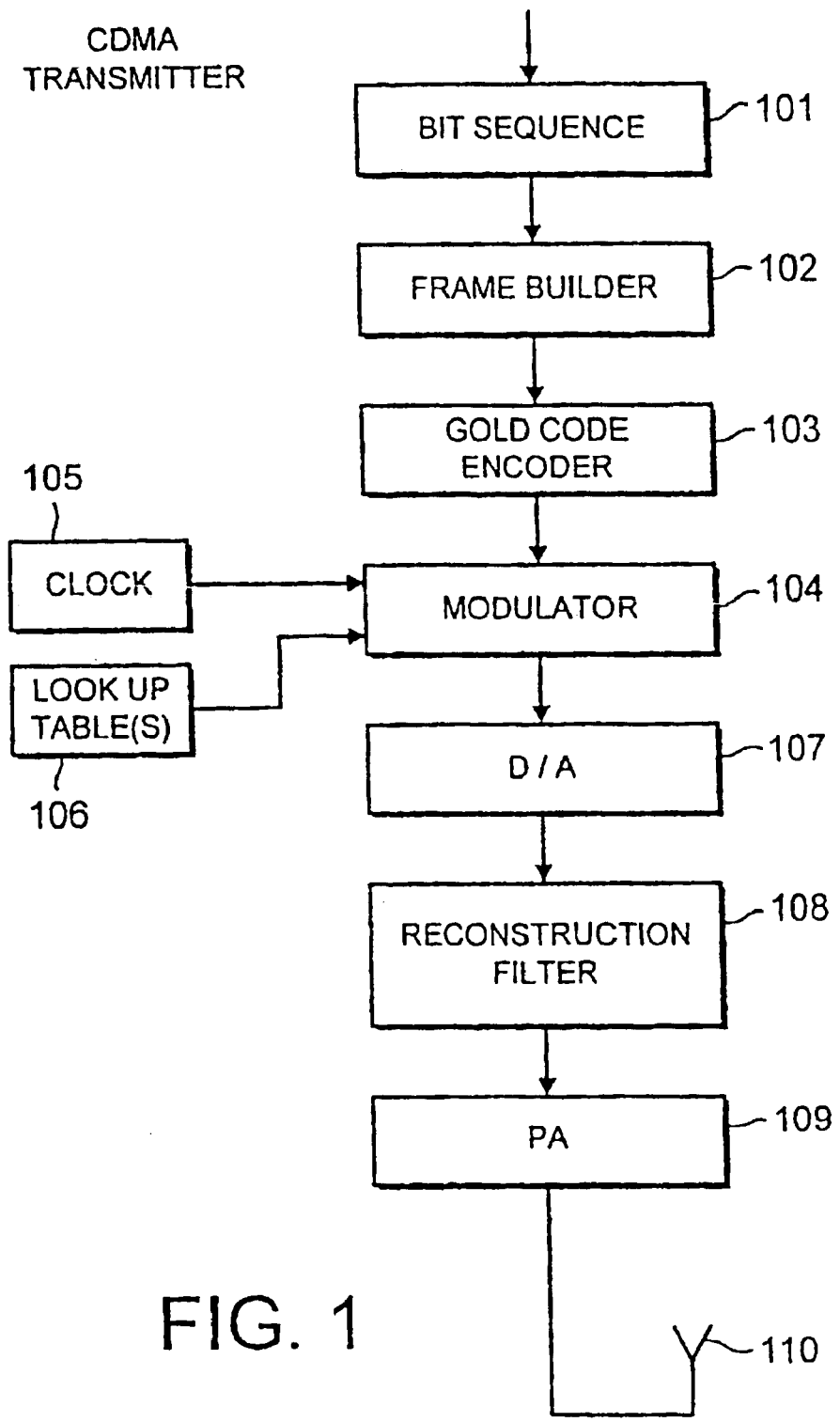
FIG. 1 is a CDMA transmitter according to an embodiment of the present invention.

A method of adaptively shaping a pulse function depending upon cost functions, according to an embodiment of the present invention is described below.

As mentioned above, only the Gaussian and root raised cosine pulses have been considered for use in modulators of telecommunications systems to date. Laurent has suggested that a Gaussian pulse can be approximated by the superposition of AM pulses ($C_0$, $C_1$, . . . etc.), these pulses being a fixed family of pulses which are functions of cos and sin. In the present invention, a totally different approach has been taken, as is outlined below.

Laurent's theory that a pulse can be approximated by the superposition of components has been implemented. However, instead of using this theory to approximate existing Gaussian pulses based on the fixed function components, Laurent's superposition expansion has been used as the basis of ascertaining a pulse shape which meets the criteria required by a particular communications system. This may be done as follows.

Firstly, the fixed function components in Laurent's superposition expansion are replaced by one or more functions representing respective unknown pulse components. Then cost functions: are looked at (e.g. BER, bandwidth, amplitude, AFC). That is, the errors from the values that the particular system requires are considered. The weightings of the cost functions can be varied so as to tailor the results. Values for each function are then determined, for example using an optimizer, which minimize these cost functions and thus give a pulse shape which meets the specified system requirements.

Preferably two functions are used as this provides more optimal pulse shaping than just using one function.

More specifically, the method can be implemented as follows:

Firstly, Laurent's formula is considered. According to Laurent's formulation:

$$S_{NT+\Delta T} = \sum_{K=0}^{M-1} \sum_{n'=0}^{L_k-1} J^{A}K, N-n' C_{K,n'T+\Delta T} \quad \text{Equation (1)}$$

where S(t) is the signal at time t $$A_{K,N} = \sum_{n=-\infty}^{N} a_n - \sum_{i=1}^{L-1} a_{N-i} \cdot \propto_{K,i}$$

$$A_{K,N} = A_{0,N} - \sum_{i=1}^{L-1} a_{N-i} \cdot \propto_{K,i}$$

$$C_K(t) = S_0(t) \times \prod_{i=1}^{L-1} S_{i-L\propto_K,i}(t) \quad (0 \le K \le M-1)$$

Instead of using Laurent's pulses, $CK_{,n'}$, an alternative pulse is used, PULSE $K_{K,n'}$, which is as yet unknown, but for which an appropriate value is to be determined depending upon requisite error function requirements.

Substituting this in equation 1 gives:

$$S_{NT+\Delta T} = \sum_{K=0}^{M-1} \sum_{n'=0}^{L_k-1} J^{A}K, N-n' \ PULSE_{K,n'T+\Delta T} \quad \text{Equation (2)}$$

where $J=\sqrt{-1}$

As mentioned above, PULSE is unknown as yet, but is, in this embodiment it is read, non zero and of maximum length 8.

In this embodiment we choose to use two components (PULSE [0] and PULSE [1]) to build up S. Hence M=2. Expanding equation (2) for M=2 and replacing the function $A_K$ with a function of the bit streams $\propto_1$, $\propto_2$, . . . , gives:

$J^{A0,N-5}$ ($J^{(\propto N-4+\propto N-3+\propto N-2+\propto N-1+\propto N)}$ Pulse [0][$\delta T$]+

$J^{(\propto N-4+\propto N-3+\propto N-2+\propto N-1)}$ Pulse [0][T+$\delta T$]+

$J^{(\propto N-4+\propto N-3+\propto N-2)}$ Pulse [0][2T+$\delta T$]+

$J^{(\propto N-4+\propto N-3)}$ Pulse [0][3T+$\delta T$]+

$J^{\propto N-4}$ Pulse [0][4T+$\delta T$]+Pulse [0][5T+$\delta T$]+

$J^{(-\propto N-5)}$ Pulse [0][6T+$\delta T$]+

$J^{(-\propto N-5-\propto N-6)}$ Pulse [0][7T+$\delta T$]+

$J^{(-\propto N-5-\propto N-6-\propto N-7)}$ Pulse [0][8T+$\delta T$]+

$J^{(\propto N-4+\propto N-3+\propto N-2+\propto N-1+\propto N\propto -\propto N-1)}$ Pulse [1][$\delta T$]+

$J^{(\propto N-4+\propto N-3+\propto N-2+\propto N-1+\propto N-2)}$ Pulse [1][T+$\delta T$]+

$J^{(\propto N-4+\propto N-3+\propto N-2+\propto N-3)}$ Pulse [1][2T+$\delta T$]+

$J^{(\propto N-4+\propto N-3-\propto N-4)}$ Pulse [1][3T+$\delta T$]+

$J^{(\propto N-4-\propto N-5)}$ Pulse [1][4T+$\delta T$]+

$J^{(\propto N-6)}$ Pulse [1][5T+$\delta T$]+

$J^{(\propto N-5+\propto N-7)}$ Pulse [1][6T+$\delta T$]) \quad Equation (3)

Since $\propto$ denotes a bit, it must be plus or minus 1. Hence each term in equation (3) can be identified as to whether it is real or imaginary (assuming that the pulse function is real).

eg: Taking the first term of the equation:

$$J\ (\alpha_{N-4}+\alpha_{N-3}+\alpha_{N-2}+\alpha_{N-1}+\alpha_N)\ \alpha_{N-4},\alpha_{n-2}\alpha_N=\text{odd}\rightarrow\text{imaginary}$$
$$\alpha_{N-3},\alpha_{N-1}=\text{even real.}$$

Hence it is possible to calculate the absolute value of this expression as a function of the bits ($\alpha$s). A decision to be made is what $\alpha$ is sent at time N. (In an ideal system this will be the signal received at baseband).

Looking at equation 3 (e.g. for a simple receiver), it can be deduced that the bit $\alpha_{N-4}$ is transmitted at time(N+4)T as it is on its own. It is imaginary, and the interfering (ie other imaginary) pulses must be taken into account. The real terms in this expression can be totally ignored both for the interfering terms and the absolute value of the pulses.

The interface should be minimized. The BER performance can, for example, be improved by making the terms Pulse[0] at (N+4)T large compared to the absolute value of all the other terms.

Therefore, given an $\alpha$x sequence of:

$$\{\alpha_N, \alpha_{N-1} \ldots \alpha_{N-7}\}=\{1,1,1,1,1,1,1,1\},$$

the absolute value of the pulse at time $\Delta T$ can be calculated in terms of the unknown pulses. The absolute value of the interfering terms at time $\Delta T$ can also be calculated in terms of the unknown pulses. This is performed for every possible combination of 1,–1 for $\alpha_N$ to $\alpha_7$ (ie all $2^8=256$ possibilities). For each possibility an expression both for interfering terms and absolute value are obtained.

In this embodiment, the pulse is required to meet certain criteria with regard to power, BER, AFC and bandwidth. Hence, error functions for these are determined.

Given an oversampling of 8, $\Delta T$ can take on the following values:

$$\Delta T = \left\{0, \frac{T}{8}, \frac{2T}{8}, \frac{3T}{8} \ldots \frac{7T}{8}\right\}$$

Clearly, the oversampling rate can be altered depending upon the level of. pulse sampling required.

The amplitude and BER costs are calculated for $\Delta T$ taking each of the above values. The total cost for each is the addition of all the 8 expressions obtained over the possible sequences.

Cost (Error) Functions (i) Amplitude Error Function

Given a constant amplitude of 1, the error in amplitude can be given by:

$$\{\text{absolute value }^2-1^2\}^2$$

(ii) BER Error Function

To calculate this, the amount of noise needs to be determined. This is given by:

$$\{\text{absolute value of interfering regions}\}^2$$

(iii) Energy Error Function

Required energy–sum of the square of the sample points.

(iv) Bandwidth Error Function

In order to estimate the bandwidth of the pulses, the derivative of the pulse functions (which at this stage are still unknown) are required. This derivative can be approximated as being the difference between two adjacent pulse values. The bandwidth for a pulse, is given by:

$$\text{sum}\{\text{derivative at the sample points}\}^2$$

This can be determined as follows:

A pulse width of 8T has been assumed and the pulse is oversampled by 8.

According to Laurent:

Pulse [0][t] is non zero for 0<t<9T

Pulse [1][t] is non zero for 0<t<7T

The unknown pulses are:

$$Pulse[0]\left[mT + \frac{nT}{8}\right] \text{ for } m = 0, 1, 2 \ldots 8$$
$$n = 0, 1, 2 \ldots 7$$

$$Pulse[1]\left[mT + \frac{nT}{8}\right] \text{ for } m = 0, 1, 2 \ldots 7$$
$$n = 0, 1, 2 \ldots 7$$

For convenience denote:

$$Pulse[0]\left[mT + \frac{nT}{8}\right] \text{ by } \chi_{0,m8+n}$$

$$Pulse[0]\left[mT + \frac{nT}{8}\right] \text{ by } \chi_{1m8+n}$$

Then for example:

$$Pulse[0]\left[2T + \frac{3T}{8}\right] = \chi_{0,19}$$

$$Pulse[1]\left[2T + \frac{3T}{8}\right] = \chi_{1,19}$$

Adjacent sample points have adjacent numbers and the set of unknowns becomes:

$X_{0,i}$ where i=0,1,2 . . . 71 and $X_{1,i}$ where i=0,1,2 . . . 55

Consequently, the approximate bandwidths for pulse [0] is as follows:

$$Pulse[0]: Sum\frac{(\chi_{0,i+1} - \chi_{0,i})^2}{T/8} \text{ for } i = 0 \text{ to } 70 \quad (a)$$

In the present embodiment, the bandwidth for the second component is to be determined, then a similar expression needs to be determined for PULSE [1]. This is as follows:

$$Pulse[1]: Sum\frac{(\chi_{1,i+1} - \chi_{0,i})^2}{T/8} \text{ for } i = 0 \text{ to } 54 \quad (b)$$

Total bandwidth for the pulse composed of the two components=(a)+(b)

The pulse can be specifically designed based on system requirements by weighting the above error functions (for example 0.3 for power, 0.3 for BER and 0.4 for bandwidth or if a system requires only, for example, bandwidth considerations, 0 for power and BER and 1 for bandwidth). More weight can be added to whatever is causing a problem. The only restriction is that the total weighting must equal +1.

Now the total error function is expressed in terms of the unknowns, namely, $X_{0,i}$(i=0 to 71) and $X_{i,j}$(i=0 to 55). To determine appropriate values for the unknowns, and thus deduce the pulse shapes, this expression is minimized using a conventional off-the-shelf otimizer, for example.

The implementation of a pulse function defined in dependence on desired cost parameters (e.g. by the above method) will now be described.

FIG. 1 illustrates a Code Division Multiple Access (CDMA) transmitter. CDMA conventionally comprises a frame made up of a dedicated physical data channel (DPDCH) and a dedicated physical control channel (DPCCH). A bit sequence 101 to be transmitted is input to a frame builder 102 of the transmitter, which puts the bits in the appropriate part of the frame (i.e. in the DPDCH).

The bit stream is then spread across the spectrum by the Gold Code Encoder. This Gold Code Encoder 103 operates as follows.

Given $\{C_0, C_1 \ldots C_{N-1}\}$ bit stream
and $\{f_0 f_1 \ldots f_{M-1}\}$ frame sequence
(i.e. M symbol bits)
the output of the Gold Code Encoder 103 is a sequence with N×M terms having the following elements:
$\{f_0C_0, f_0C_1, \ldots f_0C_{N-1}, f_1C_0 \ldots f_1C_{N-1} \ldots f_{M-1}C_{N-1} \ldots, f_{N-1}C_{M-1}\}$ Hence, there are MN chips to modulate.

A modulator 104 modulates these MN chips output by the Gold Code Encoder 103 on to a carrier, which is output by clock 105. The modulator 104 may be a QPSK modulator as is generally used in CDMA systems such as 1S95. However, in this preferred embodiment, the modulator is a continues phase modulator such as that used in MSK modulation. The bandwidth of the signal output by the modulator 104 is directly related to the spectrum of the pulses that are used to make up a lookup table 106. Conventionally, in CDMA, this lookup table would comprise data defining a root raised cosine. However, in this embodiment of the present invention, the lookup table defines a pulse whose shape has been optimized on the basis of cost (error) functions, as explained above. The output of the modulator 104 is input to a digital to analog converter 107. The analog signal is then reconstructed by a reconstruction filter 108. A reconstruction filter might typically comprise a switched capacitor filter for performing some spectral shaping and an analog filter, such as an RC filter network, for mainly dealing with residual shaping. Once the signal has been reconstructed, it is input to a power amplifier 109, which amplifies the signal for transmission by the antenna 110.

Figure 2A:
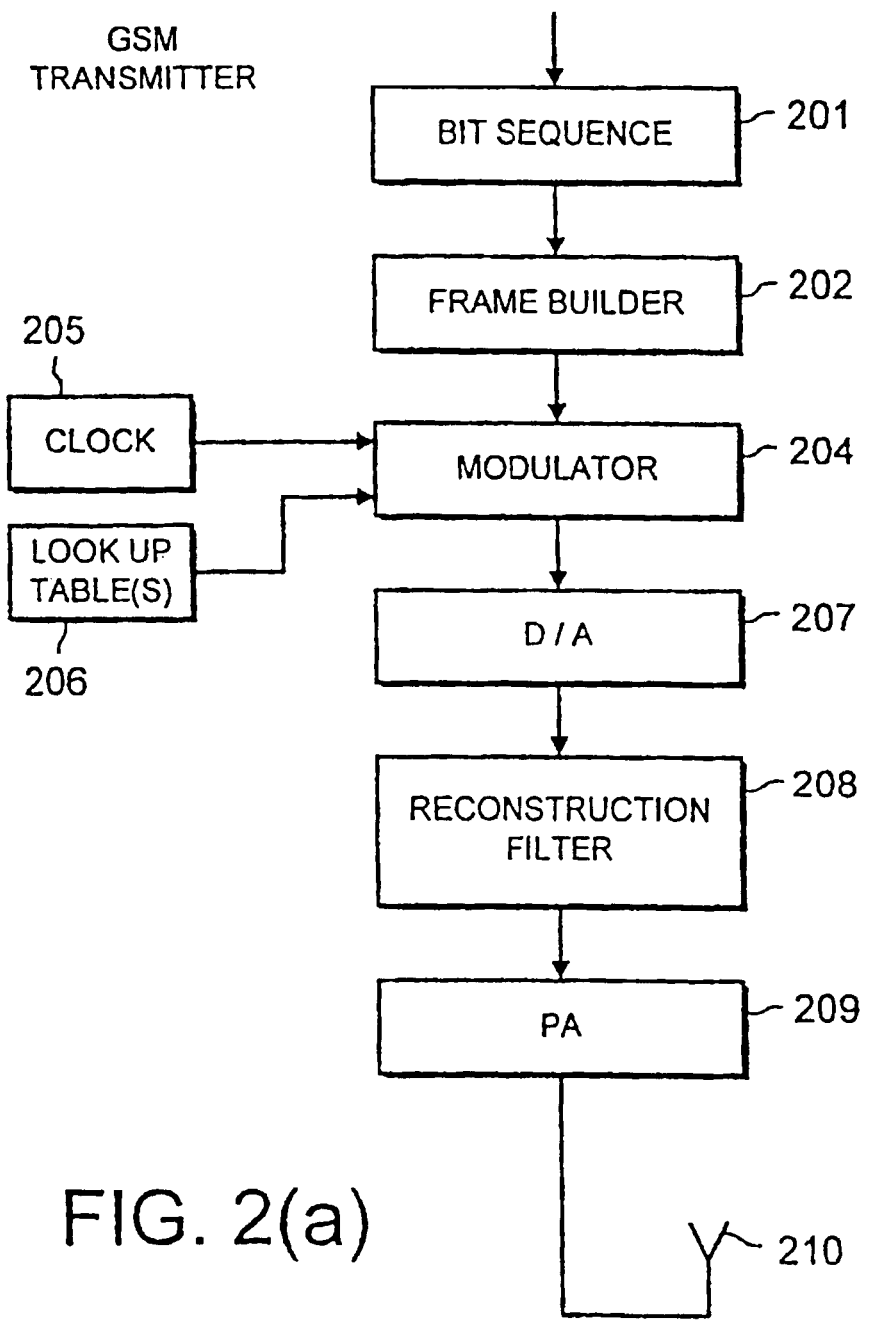
FIG. 2(a) is a GSM transmitter according to an embodiment of the present invention.
Figure 2B:
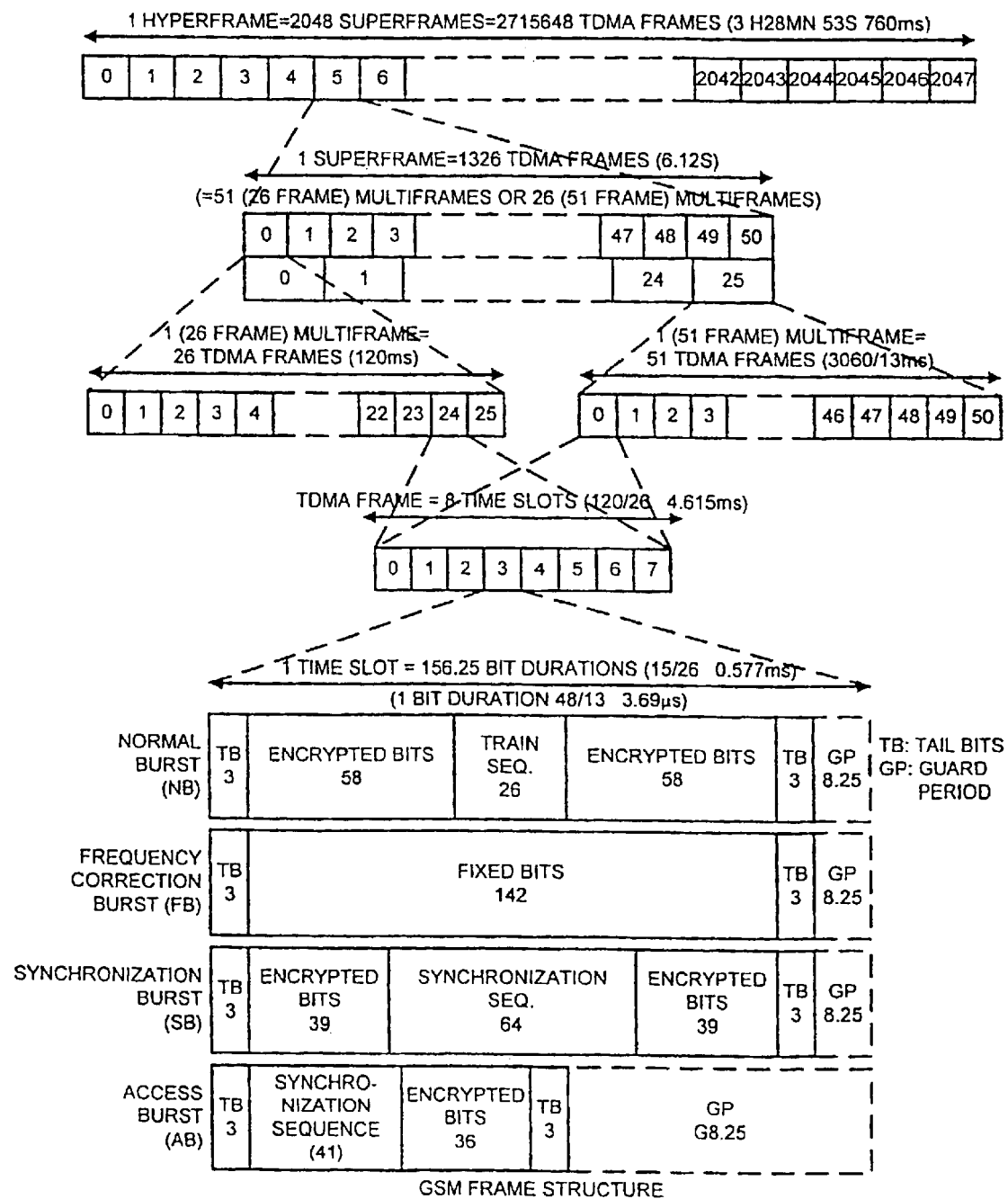
FIG. 2(b) shows the GSM frame structure.

FIG. 2a illustrates a GSM transmitter. GSM conventionally comprises a frame structure as shown in FIG. 2b. A bit sequence 201 to be transmitted is input to a frame builder 202 of the transmitter, which puts the bits in the appropriate portion of a burst within a time slot of a TDMA frame. The bit stream is then forwarded to a modulator 204. Conventionally this modulator would be a GMSK modulator. However, in this preferred embodiment the signal is not put through a Gaussian filter. Instead, a lookup table 206 defines a pulse function whose shape has been optimized on the base of the error functions as explained above. The lookup table will comprise $2^T\times$ the number of samples per second.

A clock 205 provides the carrier signal as is conventional.

The modulated signal is input to a digital/analog converter 207. This analog signal is then reconstructed by reconstruction filter 208. As with the CDMA transmitter, this filter might typically comprise a switched capacitor filter for performing some of the spectral shaping and an analog filter, such as an RO filter, for mainly dealing with residual shaping. Finally, the signal is amplified by a power amplifier 209 and is transmitted via antenna 210.

For the further evolution of GSM (EDGE), it has been proposed to improve the data rate by 3 by changing the modulation scheme. The present invention enables the data rate to be increased by designing a pulse which meets the appropriate cost functions. Consequently, the existing infrastructure can be used with its channels divided either in frequency or time.

Figure 3:
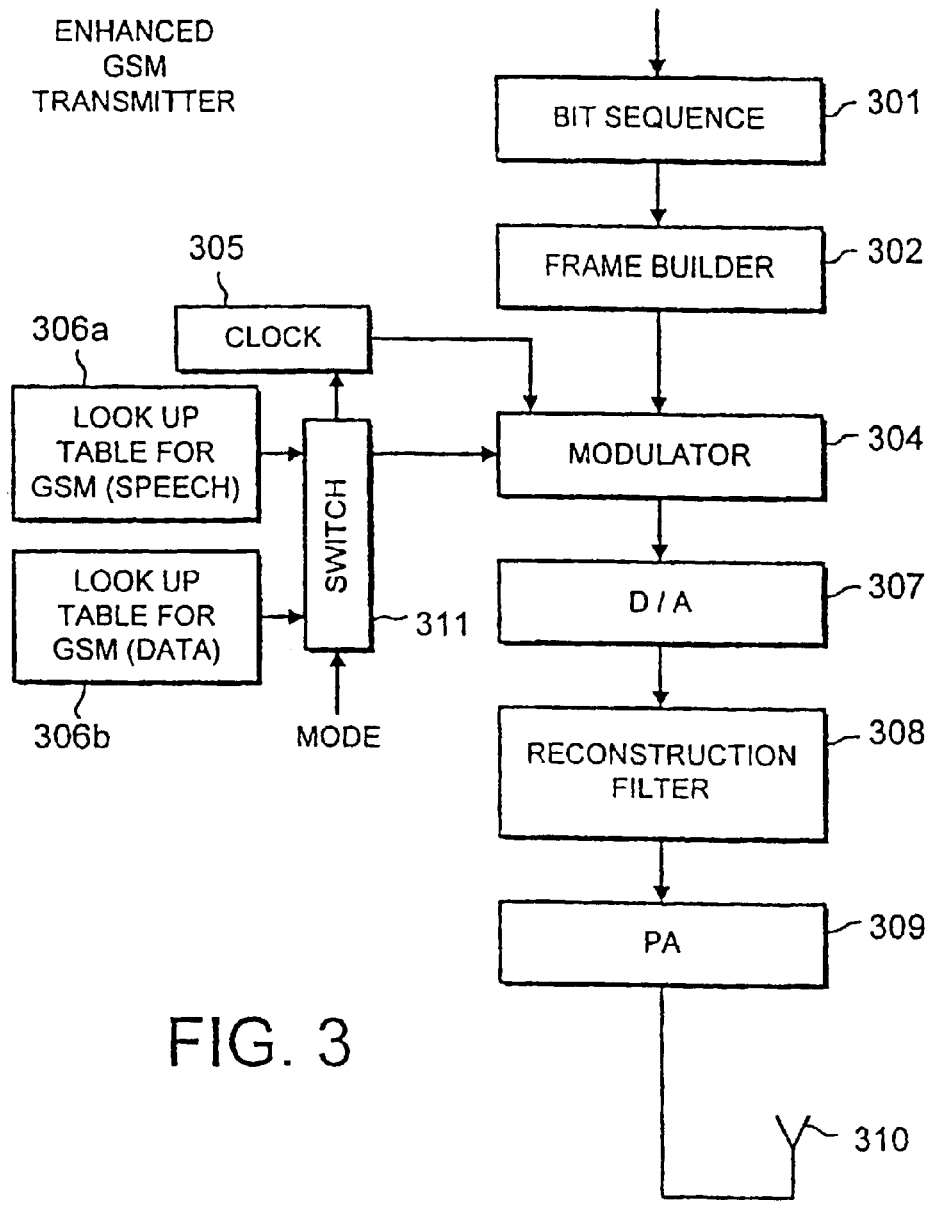
FIG. 3 is an enhanced GSM transmitter according to an embodiment of the present invention.

FIG. 3 shows an enhanced GSM transmitter which could be used in such a system. This transmitter is similar to present GSM transmitters, and in this embodiment the modulator 304 is an MSK modulator. However, this enhanced GSM transmitter comprises 2 lookup tables 306a and 306b, which define different 1413 pulse functions for acting on the bit sequence 301. Lockup table 306a comprises data defining a pulse function which can act on speech with the current data rate of 9.6 kilobits per second. The data of this lookup table could correspond to the Gaussian curve, so that it provides the same modulation (i.e. GMSK) as is currently used in GSM. However, preferably, it comprises data defining a pulse function according to the present invention, for example one which is optimized for a more stringent cost function.

Lookup table 306b, on the other hand, comprises data which defines a pulse function for acting on the bit sequence 301 for data applications. The pulse function is designed based on different cost functions from the ones required for the voice applications, as clearly data applications require a much improved data rate. Switch 311 provides connection between the modulator and the appropriate lookup table for the application required.

As mentioned previously, flexibility of choice of modulation scheme for a particular telecommunication system has been restricted due to the modulation schemes having certain efficiencies and inefficiencies tied to them. However, by removing these ties by providing a suitable pulse shape which meets the cost function requirements of a certain system, the present invention provides greater flexibility.

Figure 4:
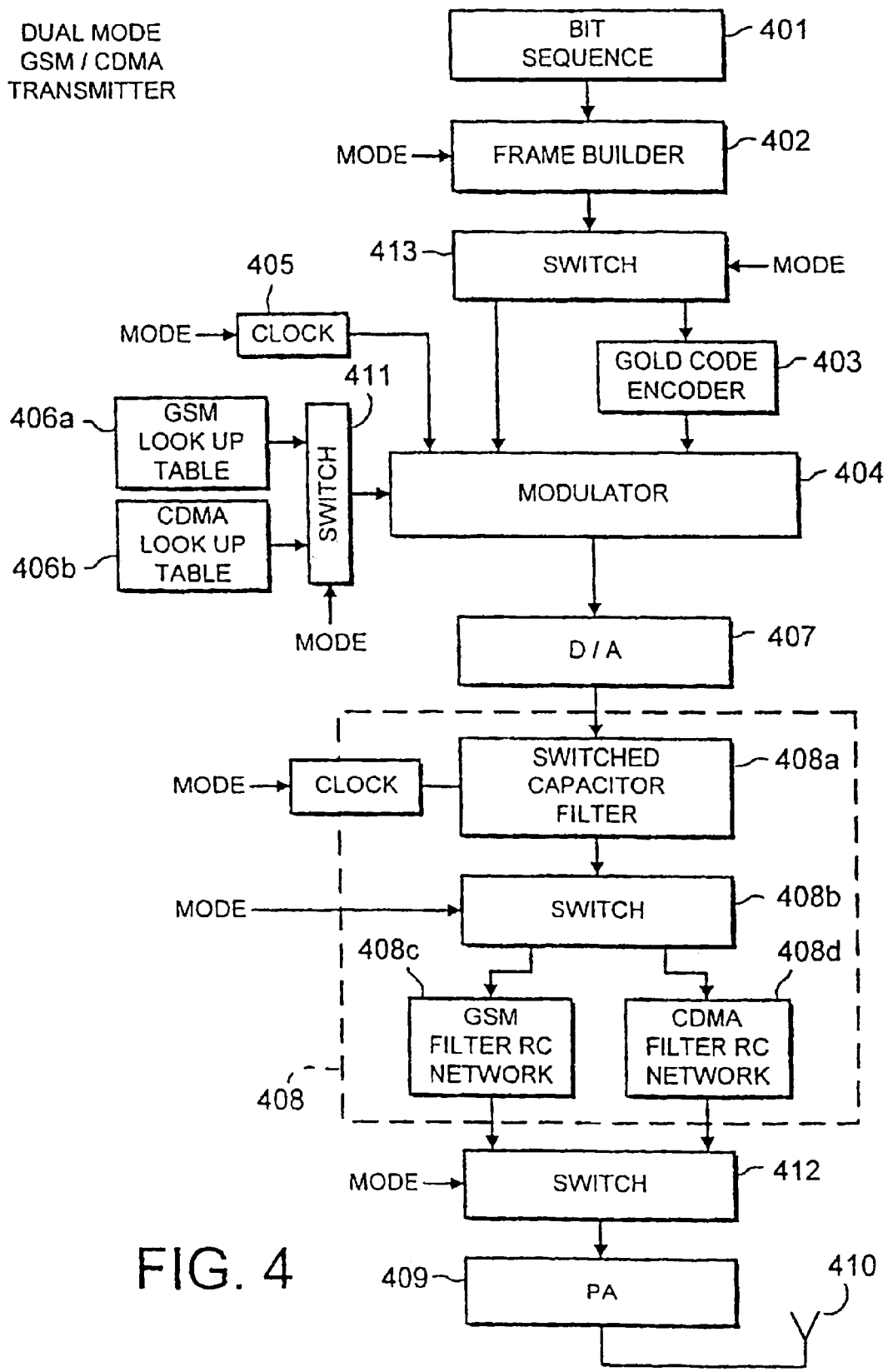
FIG. 4 is a dual mode GSM/CDMA transmitter according to an embodiment of the present invention.

FIG. 4 shows a dual mode GSM/CDMA transmitter. This transmitter is provided with a common modulator 404. This is possible because the cost function restraints of a particular modulation scheme have been reduced by the transmitter having two lookup tables 406a and 406b, which, in this embodiment respectively define pulse shapes which meet the cost function requirements of GSM and CDMA. As can be seen a number of components can be used for both GSM and CDMA operations and where two components are required a switch is included, the switch between them depending on the operation of the transmitter. For example, if in CDMA mode the bit sequence 401 would need to be encoded by a gold code encoder 403. Hence the switch would make a connection with this gold code encoder, whereas if in GSM mode it would switch straight through to the modulator. Similarly if in GSM mode, the pulse shaping is provided by GSM lookup table 406a and switch 411 provides a connection so a bit sequence can be shaped according to the data in this lookup table. Finally switch 412 is provided so that the power amplifier is connected to the filter network for the appropriate mode of operation of the transmitter.

Figure 5:
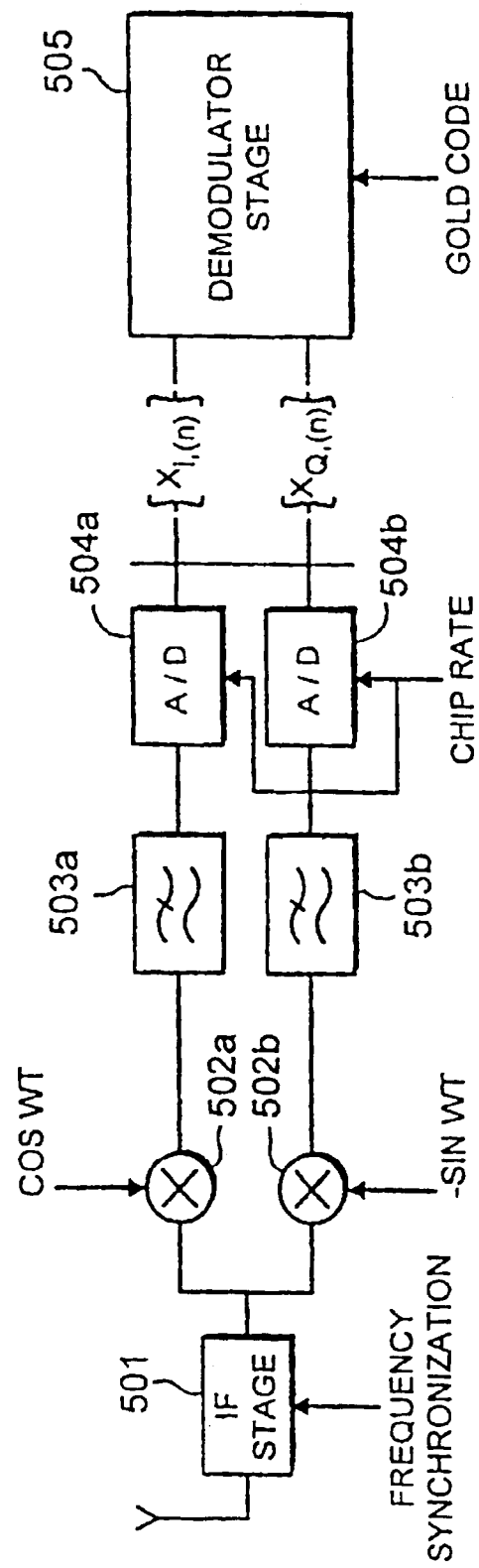
FIG. 5 is a receiver which can be used in accordance with the present invention.

FIG. 5 shows a typical receiver. A received signal is put through at least 1 IF stage 501 to reduce its frequency to a base band frequency and then the signal is split into its I and Q components and the carrier is removed from the signal, using mixers 502a and 502b and low pass filters 503a and 503b. The signal is then converted from an analog signal into a digital signal by the A/D converters 504a and 504b and forwarded to the Demodulator stage 505. At this stage, demodulation, any equalization, and decoding etc is performed.

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention. Annex 1, which is on the file of this application is hereby incorporated by reference.

What is claimed is:

1. A method for defining the relationship between frequency and amplitude of a pulse function for acting on a data stream for transmission in a telecommunications system in accordance with a predetermined modulation scheme, the method comprising:

defining desired cost parameters, and defining the amplitude of the pulse function over a range of frequencies in dependence on the desired cost parameters.

2. A method according to claim 1 wherein the amplitude, of the pulse function over a range of frequencies is defined in an iterative process in which the pulse function is altered and, the cost parameters are determined until an acceptable balance of cost parameters is achieved.

3. A method according to claim 1 wherein the method further comprises:

weighting the respective cost parameters.

4. A method according to claim 3 wherein an acceptable balance between the cost parameters is achieved by optimizing the respective costs with the respective weightings.

5. A method according to claim 4 wherein the optimization is performed using an optimizer computer program.

6. A method according to claim 1 wherein the cost parameters are selected from one or more of the group including power efficiency, spectral efficiency, bit error rate, AFC, Nyquist, and energy.

7. A pulse function generator for converting a data stream in accordance with a pulse function shaped in accordance with the relationship defined by the method of claim 1.

8. A modulator for providing a signal for transmission in a telecommunication system comprising:

means for shaping a data stream in accordance with the pulse function generator of claim 7.

9. A modulator according to claim 8 wherein the means for comprises a filter.

10. A modulator according to claim 8 wherein the means for shaping comprises a look-up table.

11. A transceiver for a communication device comprising a modulator in accordance with claim 8 and a demodulator.

12. A communication device operable in communication system comprising a transceiver according to claim 11.

13. A modulator for providing a signal for transmission in a TDMA telecommunications system in which a channel is a combination of frequency and timeslot in accordance with a predetermined modulation scheme wherein the data stream is shaped in accordance with a pulse generator of claim 7 prior to modulation with a carrier signal.

14. A modulator for providing a signal for transmission in a CDMA telecommunications system in accordance with a predetermined modulation scheme, wherein the data stream is shaped in accordance with a pulse generator of claim 7 prior to modulation with a carrier signal.

15. A modulator as claimed in claim 13, wherein the modulation scheme is MSK.

16. A modulator as claimed in claim 13, wherein the modulation scheme is MSK.

17. A dual mode communication device operable in a first mode in a TDMA telecommunications system in which a channel is a combination of frequency and timeslot and a second mode in a CDMA telecommunications system, comprising a modulator for modulating a data stream with a carrier signal in accordance with a predetermined modulation scheme in both the first and second modes of operation and a pulse function generator for shaping a data stream in accordance with pulse functions shaped in accordance with the predetermined modulation scheme of operation of the dual mode communication device.

18. A dual mode communication device operable in a first mode when a first set of cost parameters are desired and in a second mode when a second set of cost parameters are desired, the communication device comprising:

a first pulse function generator for shaping a data stream in accordance with a pulse function shaped in accordance with the predetermined modulation scheme;

a second pulse function generator for shaping a data stream in accordance with a pulse function shaped in accordance with the predetermined modulation scheme; and means for selecting the pulse function generator in accordance with the mode of operation of the dual mode communication device, and wherein at least one of the pulse functions is shaped in accordance with the relationship defined by the method of claim 1.

19. A communication device as claimed in claim 18, which is operable at a first data rate in the first mode and a second data rate in the second mode.

20. A communication device as claimed in claim 19, wherein the first data rate supports voice applications and the second data rate supports data applications.

21. A communication device as claimed in claim 18, operable in a TDMA telecommunications system.

22. A communication device as claimed in claim 18, wherein the first pulse function generator generates a pulse of Gaussian shape.

23. A dual mode communication device operable in a first mode when a first set of cost parameters are desired and in a second mode when a second set of cost parameters are desired, the communication device comprising:

a modulator for modulating a data stream with a carrier signal in accordance with a predetermined modulation scheme in both the first and second modes of operation;

a first pulse function generator for shaping a data stream in accordance with a pulse function shaped in accordance with the predetermined modulation scheme;

a second pulse function generator for shaping a data stream in accordance with a pulse function shaped in accordance with the predetermined modulation scheme; and means for selecting the pulse function generator in accordance with the mode of operation of the dual mode communication device.

24. A method for selecting a modulation scheme for a communication system, the method comprising:

defining a pulse function for a first modulation scheme of the predetermined modulation scheme in accordance with the method as claimed in claim 1;

defining a pulse function for a second modulation scheme of the predetermined modulation scheme for the same desired cost parameters;

determining the resultant cost parameters for each scheme; and selecting the modulation scheme which gives good resultant cost parameters given the desired ones.

25. A method for defining the relationship between frequency and amplitude of a pulse function for acting on a data stream for transmission in a telecommunications system in accordance with a predetermined modulation scheme, the telecommunications system having desired criteria for respective associated cost parameters, the method comprising:

providing a set of cost functions each representing deviation of a respective one of the associated cost parameters from the desired criteria of the system; and defining the amplitude of the pulse function over a range of frequencies in dependence on respective weightings of a plurality of cost functions selected from the set of cost functions.

26. A pulse function generator arranged to convert a data stream in accordance with a pulse function shaped in accordance with the relationship defined by the method of claim 25.

27. A modulator for providing a signal for transmission in a telecommunication system comprising:

means arranged for shaping a data stream in accordance with the pulse function generator of claim 26.

28. A transceiver for a communication device comprising a modulator in accordance with claim 27 and a demodulator.

29. A communication device operable in communication system comprising a transceiver according to claim 28.

30. A modulator for providing a signal for transmission in a TDMA telecommunications system in which a channel is a combination of frequency and timeslot in accordance with a predetermined modulation scheme wherein the data stream is shaped in accordance with a pulse generator of claim 26 prior to modulation with a carrier signal.

31. A modulator for providing a signal for transmission in a CDMA telecommunications system in accordance with a predetermined modulation scheme, wherein the data stream is shaped in accordance with a pulse generator of claim 26 prior to modulation with a carrier signal.

32. A dual mode communication device operable in a first mode having a first set of desired criteria for respective associated cost parameters and in a second mode having a second set of desired criteria for respective associated cost parameters, the communication device comprising:

a first pulse function generator for acting on a data stream in accordance with a first pulse function for transmission in a telecommunications system in accordance with a first modulation scheme;

a second pulse function generator for acting on a data stream in accordance with a second pulse function for transmission in a telecommunications system in accordance with a second modulation scheme; and means for selecting the pulse function generator in accordance with the mode of operation of the communication device; and wherein at least one of the pulse functions is shaped in accordance with the relationship defined by the method of claim 25.

33. A dual mode communication device operable in a first mode having a first set of desired criteria for respective associated cost parameters and in a second mode having a second set of desired criteria for respective associated cost parameters, the communication device comprising:

a modulator for modulating a data stream with a carrier signal in accordance with a predetermined modulation scheme in both the first and second modes of operation;

a first pulse function generator for shaping a data stream in accordance with a pulse function shaped in accordance with the predetermined modulation scheme;

a second pulse function generator for shaping a data stream in accordance with a pulse function shaped in accordance with the predetermined modulation scheme; and means for selecting the pulse function generator in accordance with the mode of operation of the communication device; and wherein at least one of the pulse functions is shaped in accordance with the relationship defined by the method of claim 25.

34. A method for selecting a modulation scheme for a communication system, the method comprising:

defining a pulse function for a first modulation scheme in accordance with the method as claimed in claim 25;

defining a pulse function for a second modulation scheme for a same set of cost functions;

determining the resultant cost parameters for each scheme; and selecting the modulation scheme which provides resultant cost parameters given the desired cost parameters.

\* \* \* \* \*